United States Patent
Bal et al.

(10) Patent No.: US 8,158,951 B2
(45) Date of Patent: Apr. 17, 2012

(54) APPARATUS AND METHODS FOR EVALUATING OPERATION OF PIXELATED DETECTORS

(75) Inventors: Girish Bal, Niskayuna, NY (US);
Floribertus Heukensfeldt Jansen, Ballston Lake, NY (US); Osnat Zak, Haifa (IL); Gideon Berlad, Haifa (IL); Yaron Hefetz, Herzeliya (IL); Sergei Dolinsky, Clifton Park, NY (US); Brian D. Yanoff, Niskayuna, NY (US); John Eric Tkaczyk, Niskayuna, NY (US); Yanfeng Du, Niskayuna, NY (US); Ravindra Mohan Manjeshwar, Glenville, NY (US); Evren Asma, Niskayuna, NY (US); Qian Hua, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 568 days.

(21) Appl. No.: 12/365,100

(22) Filed: Feb. 3, 2009

(65) Prior Publication Data

US 2010/0193697 A1    Aug. 5, 2010

(51) Int. Cl.
*G01T 1/00* (2006.01)
(52) U.S. Cl. .................................................. 250/370.09
(58) Field of Classification Search ............. 250/370.09
See application file for complete search history.

(56) References Cited

U.S. PATENT DOCUMENTS

| 6,529,622 | B1 * | 3/2003 | Pourjavid .................. 382/149 |
| 7,003,146 | B2 * | 2/2006 | Eck et al. .................. 382/132 |
| 7,009,183 | B2 | 3/2006 | Wainer et al. |
| 2006/0115149 | A1 * | 6/2006 | Van Der Heide ............. 382/167 |

* cited by examiner

Primary Examiner — Constantine Hannaher
(74) Attorney, Agent, or Firm — Marie-Claire Maple

(57) ABSTRACT

An apparatus and methods for evaluating the operation of pixelated detectors are provided. The method includes obtaining data values for each of a plurality of pixels of a pixelated detector and determining a data consistency metric for each of the plurality of detector pixels. The method further includes identifying, using the determined data consistency metric, any detector pixels that exceed an acceptance criterion as noisy pixels.

34 Claims, 6 Drawing Sheets

APPARATUS AND METHODS FOR EVALUATING OPERATION OF PIXELATED DETECTORS

BACKGROUND OF THE INVENTION

This invention relates generally to imaging systems, and more particularly, to nuclear medicine imaging systems having pixelated detectors.

Nuclear medicine imaging systems, for example, Single Photon Emission Computed Tomography (SPECT), Computed Tomography (CT) and Positron Emission Tomography (PET) imaging systems, use several image detectors, such as one, two or three detectors, to acquire imaging data, such as gamma ray or photon imaging data. The image detectors may be, for example, gamma cameras that acquire two-dimensional views of three-dimensional distributions of radionuclides emitted from an object (e.g., a patient) being imaged. The image detectors may be rotated about a patient to acquire a plurality of two-dimensional images (also referred to as projections) to create a multi-dimensional image of a structure of interest or photons transmitted through the object. These rotating nuclear medicine systems are referred to as single photon emission computed tomography (SPECT) imaging systems. In SPECT systems, 40, 60 or more projections may be acquired, which are then reconstructed to generate a three-dimensional dataset. Iterative reconstruction algorithms known in the art may then use information about the physical construction and properties of the imaging system to reconstruct the dataset into three-dimensional and/or four-dimensional representations. The three-dimensional or four-dimensional dataset then may be used to show different slices along or regions within the dataset and display the results as an image similar to images obtained from other tomographic imaging scans, such as, magnetic resonance imaging (MRI) and computed-tomography (CT) scans.

Gamma cameras for detecting photons for SPECT, PET, CT, etc. are often fabricated from semiconductor materials, such as cadmium zinc telluride (CdZnTe), often referred to as CZT, cadmium telluride (CdTe), gallium arsenide (GaAs) and silicon (Si), among others. These semiconductor gamma cameras typically include arrays of pixelated detectors or detector modules. In these pixelated detectors, individual or groups of pixels that are not operating properly, either continuously or intermittently, can cause significant problems during image reconstruction. For example, one or more detector pixels may be incorrectly adding photon counts such that photon count data from those detector pixels improperly dominates the image reconstruction process. The one or more detector pixels that are not operating properly can cause significant image artifacts, thereby decreasing image quality and reducing the reliability of the results and any analysis of the images. In order to address the problem with the pixels in the detector that are not operating properly, the entire detector may have to be replaced at a very high cost.

BRIEF DESCRIPTION OF THE INVENTION

In accordance with an embodiment of the invention, a method for identifying noisy pixels in a pixelated detector is provided. The method includes obtaining data values for each of a plurality of pixels of a pixelated detector and determining a data consistency metric for each of the plurality of detector pixels. The method further includes identifying, using the determined data consistency metric, any detector pixels that exceed an acceptance criterion as noisy pixels.

In accordance with another embodiment of the invention, a method for dynamically detecting and disabling noisy pixels in a pixelated detector is provided. The method includes using at least one statistical measure to determine a detector pixel that is not operating properly and re-projecting a reconstructed image to identify the detector pixel not operating properly. The method further includes correcting the identified detector pixel.

In accordance with yet another embodiment of the invention, a diagnostic imaging system is provided that includes at least one pixelated detector including a plurality of pixels and configured to acquire photon data. The diagnostic imaging system further includes a detector processor configured to identify any of the plurality of detector pixels for which the detected number of photons exceeds a statistical acceptance criterion as compared to other detector pixels of the plurality of pixels to determine noisy pixels.

DETAILED DESCRIPTION OF THE INVENTION

Figure 1:
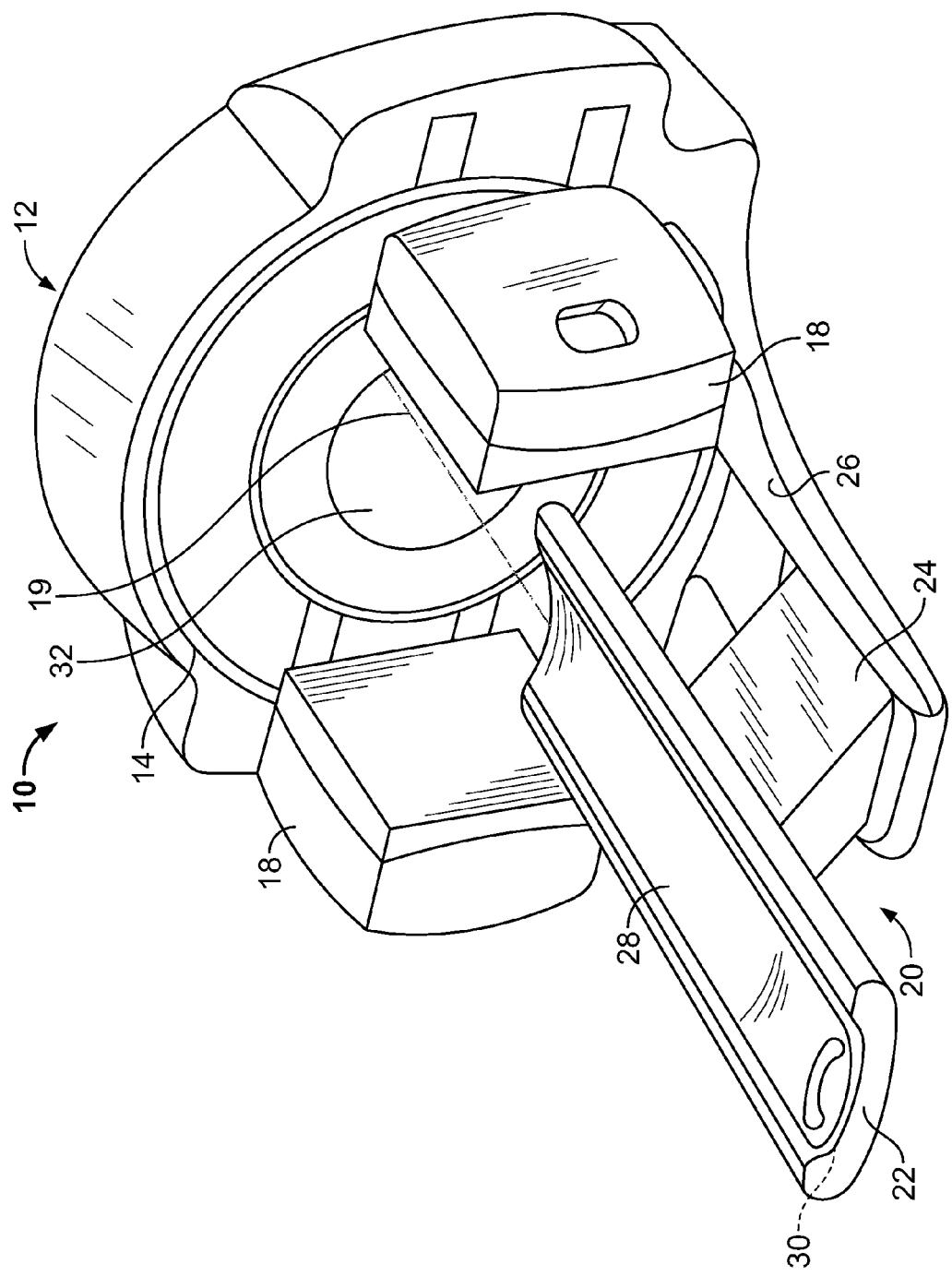
FIG. 1 is a perspective view of an exemplary nuclear medicine imaging system constructed in accordance with an embodiment of the invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of the invention provide diagnostic imaging systems with imaging detectors and methods for evaluating the operation of the imaging detectors. More particularly, the various embodiments provide for the identification of pixels in a pixelated detector that are not operating properly. The various embodiments then may, for example, compare the statistical deviation of each detector pixel with that of a neighboring or adjacent region to identify the noisy pixels on the detector as described in more detail below.

It should be noted that although the various embodiments are described in connection with nuclear medicine imaging systems having particular components, including specific pixelated detectors, the various embodiments are not limited to nuclear medicine imaging systems or to specific pixelated detectors. Accordingly, the various embodiments may be implemented in connection with any type of diagnostic imaging system, for example, medical diagnostic imaging system (e.g., computed tomography system), non-destructive testing system, security monitoring system (e.g., air baggage or airport security imaging system), etc.

FIG. 1 is a perspective view of an exemplary embodiment of a medical imaging system 10 constructed in accordance with various embodiments of the invention, which in this embodiment is a nuclear medicine imaging system, and more particularly, a single photon emission computed tomography (SPECT) imaging system. The system 10 includes an integrated gantry 12 that further includes a rotor 14 oriented about a gantry central bore 32. The rotor 14 is configured to support one or more nuclear medicine (NM) cameras 18 (two cameras 18 are shown), such as, but not limited to gamma cameras, SPECT detectors, multi-layer pixelated cameras (e.g., Compton camera) and/or PET detectors. It should be noted that when the medical imaging system 10 includes a CT camera or an x-ray camera, the medical imaging system 10 also includes an x-ray tube (not shown) for emitting x-ray radiation towards the detectors. In various embodiments, the cameras 18 are formed from pixelated detectors as described in more detail below. The rotors 14 are further configured to rotate axially about an examination axis 19. A patient table 20 may include a bed 22 slidingly coupled to a bed support system 24, which may be coupled directly to a floor or may be coupled to the gantry 12 through a base 26 coupled to the gantry 12. The bed 22 may include a stretcher 28 slidingly coupled to an upper surface 30 of the bed 22. The patient table 20 is configured to facilitate ingress and egress of a patient (not shown) into an examination position that is substantially aligned with examination axis 19. During an imaging scan, the patient table 20 may be controlled to move the bed 22 and/or stretcher 28 axially into and out of a bore 32. The operation and control of the imaging system 10 may be performed in any manner known in the art.

It should be noted that the various embodiments may be implemented in connection with imaging systems that include rotating gantries or stationary gantries.

Figure 2:
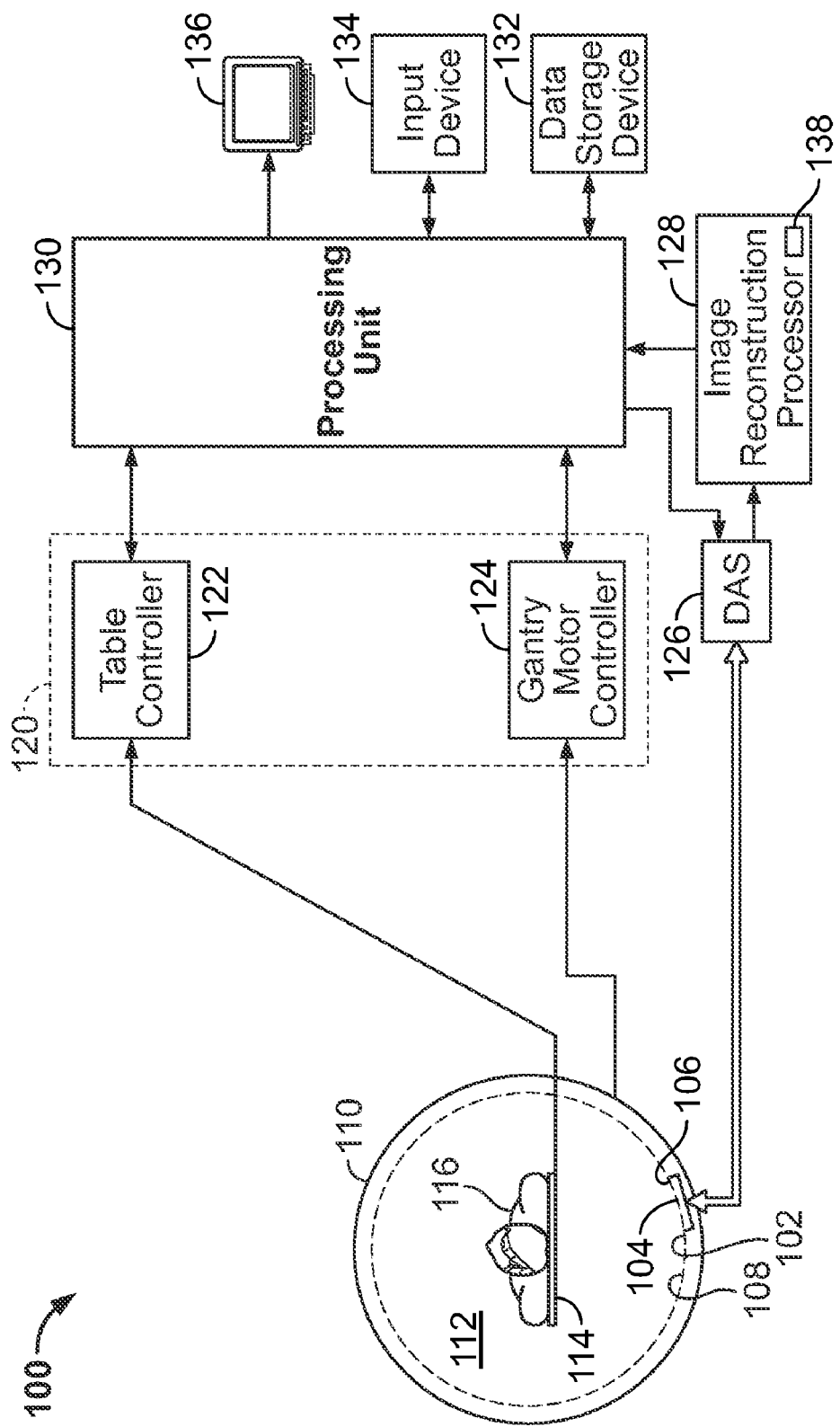
FIG. 2 is a schematic illustration of an exemplary nuclear medicine imaging system constructed in accordance with another embodiment of the invention.

FIG. 2 is a schematic illustration of an NM imaging system 100 that has a plurality of imaging detectors mounted on a gantry. In various embodiments, more than two imaging detectors are provided and are dimensionally smaller than the cameras 18 of the system 10 of FIG. 1. In FIG. 2, and for example, first, second, third through N imaging detectors 102, 104, 106 and 108 are mounted on a gantry 110. The cameras 18 of the system 10 are large enough to image most or all of a width of a patient's body at one time and may have a diameter of approximately 40 centimeters (cm) or more. Each of the first, second, third through N imaging detectors 102, 104, 106 and 108 are smaller than the cameras 18. Each of the first through N imaging detectors 102-108 may have dimensions of, for example, 4 cm to 20 cm and may be formed of cadmium zinc telluride (CZT) tiles to define pixelated detectors as described in more detail below. The first through N imaging detectors 102-108 may be different sizes and/or shapes with respect to each other, such as square, rectangular, circular or other shapes. By positioning multiple imaging detectors at multiple positions with respect to a patient 116, radiation or imaging data specific to a structure of interest within the patient 116 may be acquired without moving the imaging detectors relative to the patient 116.

Each of the first through N imaging detectors 102-108 may include a 2D array of M×N pixels, for example, 32×32 pixels. Each of the detectors 102-108 in one embodiment are stationary, viewing the structure of interest from one particular direction. However, the detectors 102-108 also may rotate about the gantry 110. Optionally, the detectors 102-108 are stationary and one or more collimators (not shown and as are known in the art) are rotated in front of one or more of the detectors 102-108. The collimators also may be stationary relative to the detectors 102-108. Each detector captures a 2D image that may be defined by the x and y location of the pixel and the detector number. Further, in other exemplary embodiments, some or all of the plurality of detectors 102-108 may change orientation relative to a stationary or movable gantry. It should be noted that the various embodiments are not limited to 2D detectors, but may be implemented in connection with any N-dimensional detector configuration, where N is a real number.

Each of the first through N imaging detectors 102-108 has a radiation detection face (not shown) that is directed towards, for example, a structure of interest within the object 116, such as a patient or animal. One or more of the radiation detection faces are covered by a collimator (not shown) as described above. Different types of collimators as known in the art may be used, such as pinhole, fan-beam, cone-beam, diverging and parallel-beam type collimators. An actual field of view (FOV) of each of the first through N imaging detectors 102-108 may be directly proportional to the size and shape of the respective imaging detector 102-108, or may be changed using a collimator.

The gantry 110 may have a bore 112 therethrough. A patient table 114 is configured with a support mechanism (not shown) to support and carry the patient 116, optionally, in a plurality of viewing positions within the bore 112 and relative to the first through N imaging detectors 102-108. Alternatively, the gantry 110 may include a plurality of gantry segments (not shown), each of which may independently move one imaging detector or a subset of imaging detectors. The gantry 110 also may be configured in other shapes, for example, as a "C" or "L", and may be rotatable about the patient 116.

In one embodiment of the imaging system 100, N equals 27, and thus there are 27 imaging detectors arranged in a ring on the gantry 110 around a patient 116. It should be understood that there may be more or less than 27 imaging detectors, and that the imaging detectors may be arranged in an arc, in more than one circle or ring, or in other configurations. By way of example, the 27 imaging detectors may be arranged in three C-shaped arches (not shown) of 9 imaging detectors each. Each of the first through N imaging detectors 102-108 in one embodiment is approximately 8×8 cm in size and includes a corresponding single pinhole collimator (not shown). The assembly of the first through N imaging detectors 102-108 thus forms an arch of approximately 30 cm of axial width (allowing for gaps between the first through N imaging detectors 102-108 as well as radiation shielding), and spans just over 180 degrees about the patient 116. Optionally, the arch may not be configured as a section of a circle, but instead constructed to fit to the shape of a typical patient or the particular patient 116. Optionally, the arch may be stationary and fixed to a stationary gantry 110. The location of the pinholes of the pinhole collimators relative to the sensitive area of the imaging detectors 102-108 may be arranged such that the FOV of all the first through N imaging detectors 102-108 is overlapped on a relatively small volume where the organ to be imaged is located. For example, the organ may be the patient's heart, and the patient 116 is moved to the correct position by moving the patient table 114.

A controller unit 120 may control the movement and positioning of the patient table 114, the gantry 110 and/or the first through N imaging detectors 102-108 with respect to each other to position the desired anatomy of the patient 116 within the FOVs of the first through N imaging detectors 102-108 prior to acquiring an image of the anatomy of interest. The controller unit 120 may have a table controller 122 and gantry motor controller 124 that may be automatically commanded by a processing unit 130, manually controlled by an operator, or a combination thereof. The gantry motor controller 124 may move the first through N imaging detectors 102-108 with respect to the patient 116 individually, in segments or simultaneously in a fixed relationship to one another. The table controller 122 may move the patient table 114 to position the patient 116 relative to the FOV of one or more of the first through N imaging detectors 102-108. Optionally, one or more collimators (not shown) may be moved relative to the first through N imaging detectors 102-108. The various embodiments also may be used of the object 116 moves relative to the collimators and/or detector (system).

The first through N imaging detectors 102-108, gantry 110, and patient table 114 remain stationary after being initially positioned, and imaging data is acquired and processed as discussed below. The imaging data may be combined and reconstructed into a composite image, which may comprise two-dimensional (2D) images, a three-dimensional (3D) volume or a 3D volume over time (4D).

A Data Acquisition System (DAS) 126 receives analog and/or digital electrical signal data produced by the first through N imaging detectors 102-108 and decodes the data for subsequent processing. An image reconstruction processor 128 receives the data from the DAS 126 and reconstructs an image using any reconstruction process known in the art. A data storage device 132 may be provided to store data from the DAS 126 or reconstructed image data. An input device 134 also may be provided to receive user inputs and a display 136 may be provided to display reconstructed images.

The NM imaging system 100 also includes a detector processor 138 that identifies detector pixels within the first through N imaging detectors 102-108 (or the cameras 18 shown in FIG. 1) that are not operating properly. For example, the detector processor 138 can identify detector pixels that are registering excessive numbers of photon counts as described in more detail below, which information is then used by the image reconstruction processor 128 when reconstructing an image.

Figure 3:
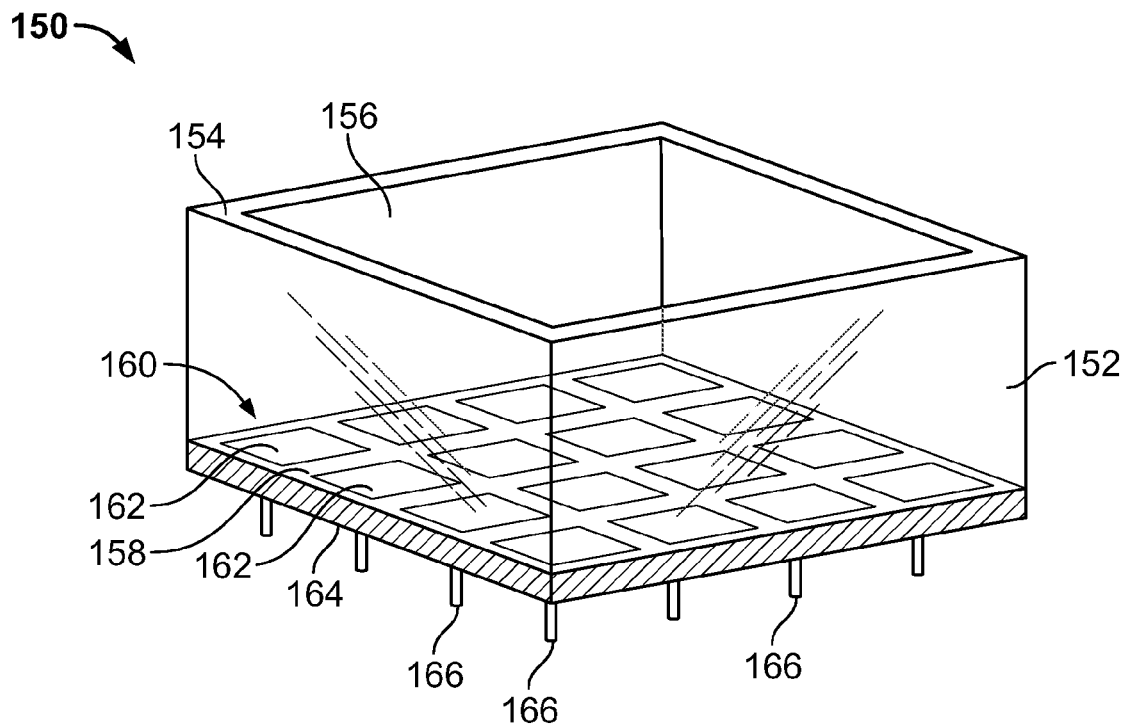
FIG. 3 is a top perspective view of a pixelated photon detector in connection with which various embodiments of the invention may be implemented.

In various embodiments, the cameras 18 and the first through N imaging detectors 102-108 are formed from pixelated photon detectors. For example, and as shown in FIG. 3, one or more pixelated semiconductor photon detectors 150 may be provided. The pixelated detectors 150 may be formed of any semiconductor material as known in the art, for example, cadmium zinc telluride (CdZnTe), often referred to as CZT, gallium arsenide (GaAs) and silicon (Si), among others. Specifically, the pixelated detectors 150 include a crystal 152 formed from the semiconductor material. A face 154 of the crystal 152 includes a single cathode electrode 156. An opposite face 158 of the crystal 152 includes an anode 160 having a rectangular (e.g., square) array of pixels 162. The pixels 162 may be of substantially the same size and also may be rectangular in shape. The size of the pixels 162 varies, for example, between 1 mm$^2$ and 4 mm$^2$. Also, the number of pixels 162 may be greater or smaller than the sixteen shown, for example, thirty-two pixels 162 may be provided. It also should be noted that the thickness of the crystal 152 may vary between several millimeters to several centimeters. In operation, and as is known, a voltage difference is applied between the cathode electrode 156 and the anode 160 to generate an electric field in the crystal 152.

In operation, when a photon having energy typical of the energies of photons used in SPECT, CT or PET applications is incident on the crystal 152, the photon generally interacts with the crystal 152 and pairs of mobile electrons and holes in a small localized region of the crystal 152 are generated through a secondary ionization process. As a result of the applied electrical field, the holes drift to cathode 156 and the electrons drift to anode 160, thereby inducing charges on the pixels 162 and the cathode 156. The induced charges on detector pixels 162 are sensed and may be partially preprocessed by appropriate electronic circuits (e.g., ASICs) within a detector base 164 and on which the pixelated detector 150 is mounted. The detector base 164 includes connection members, for example, connection pins 166 for mounting to, for example, a motherboard (not shown) and transmitting signals from the ASICs to the motherboard. Signals from the induced charges on pixels 162 are used to determine the time at which a photon is detected, how much energy the detected photon deposited in the crystal and where in the crystal the photon interaction took place as is known in the art. This information is then used to reconstruct an image, for example, using the image reconstruction processor 128.

Figure 4:
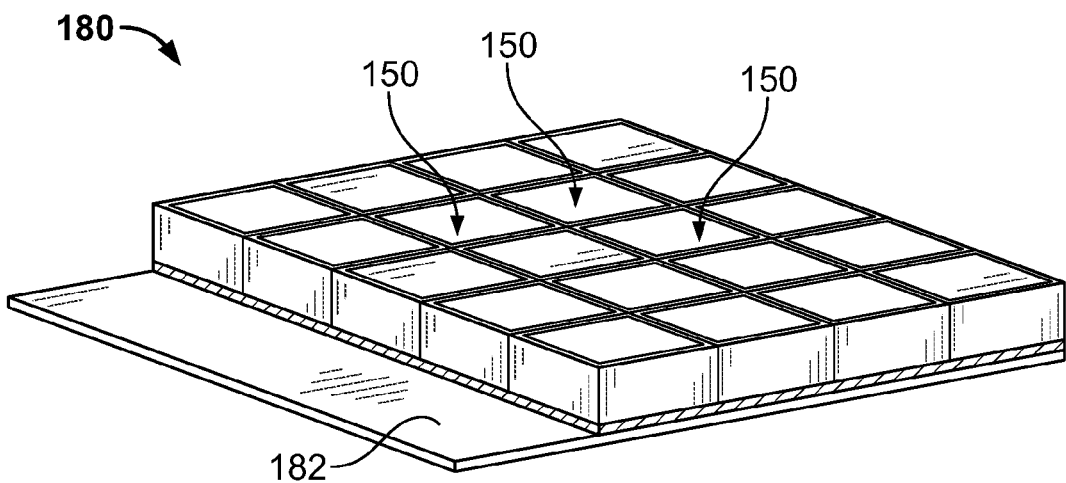
FIG. 4 is a top perspective view of a gamma camera including a plurality of pixelated photon detectors of FIG. 3.

FIG. 4 illustrates a rectangular gamma camera 180, for example, the first through N imaging detectors 102-108 (shown in FIG. 2) or the cameras 18 (shown in FIG. 1) that includes a plurality, for example, twenty pixelated detectors 150 arranged to form a rectangular array of five rows of four detectors 150. The pixelated detectors 150 are shown mounted on a motherboard 182. It should be noted that gamma cameras 180 having larger or smaller arrays of pixelated detectors 150 may be provided. One type of pixelated detector that may be used in connection with the various embodiments of the invention is described in U.S. Pat. No. 7,009,183 entitled "Pixelated Photon Detector."

In operation, the energy of a photon detected by a pixelated detector 150 is generally determined from an estimate of the total number of electron-hole pairs produced in the crystal 152 of the detector 150 when the photon interacts with the material of the crystal 152. This count is generally determined from the number of electrons produced in the ionizing event, which is estimated from the charge collected on the anode 160 of the detector 150. The energy resolution of the detector 150 is a function of how accurately the number of electron-hole pairs produced in the detector by a detected photon can be estimated.

If electrons and holes produced by a photon detected in the detector 150 are properly collected by the detector electrodes, then the induced charge on either the anode 160 or the cathode 156 of the detector 150 is a correct measure of the energy of the photon. However, one or more detector pixels 162 may either continuously or intermittently not operate properly or fail to operate such that the detector pixel 162 is noisy. The detector processor 138 (shown in FIG. 2) processes acquired information from the detectors 150 to identify any detector pixels 162 that are not operating properly and compensates for the effects of the detector pixels 162 that are failing to operate properly, and in particular, the pixels 162 that fail to register an accurate number of photon counts (which may include an acceptable variance or tolerance). It should be noted that boundary information regarding an object (e.g., patient or a portion of the patient) being imaged also may be used such that detector pixels 162 outside the boundary of the object not experiencing any activity are identified, for example, by mapping a projection of the object onto the detector(s) 150.

More particularly, the detector pixels 162 not operating properly are identified and the effect of these pixels 162 removed or compensated for during image reconstruction. It should be noted that the cause of failure of the detector pixel 162 may be one or combination of: defects in the crystal, defects in the electrode attached or deposited on the crystal, electrical connection of bias potential to the electrodes, electrical connection between electrodes and the signal processor, which may be an Application Specific Integrated Circuit (ASIC) integrated or located in proximity to the crystal, or a defective channel within the ASIC or an incorrect calibration of the channel.

In general, the various embodiments determine whether the number of counts or detector pixel data value of a particular pixel 162 is not consistent with (e.g., much higher or lower than) adjacent or neighboring pixels 162. For example, in the system 100 configured having a pre-clinical SPECT geometry wherein a plurality of detectors 150, for example, ten stationary detectors 150 are provided and photon data is acquired by rotating a collimator in front of each of the stationary detectors, for example, the first through N imaging detectors 102-108, the data (e.g., photon count data or detector pixel data value) for all collimator locations (e.g., at each incremental position along the gantry 110) is summed together. Detector pixels 162 that are not operating properly then may be determined using different statistical properties as described in more detail below.

As another example, if the system 100 is configured having stationary first through N imaging detectors 102-108 and one or more collimators stationary with respect to the first through N imaging detectors 102-108, the measured data can be divided into different time bins and statistical methods used to determine detector pixels 162 that are not operating properly and as described in more detail below. Using the information regarding the detector pixels 162 that are not operating properly, those pixels 162 can be flagged or marked, the image data collected by those pixels 162 removed during reconstruction, the detector pixels 162 deactivated or data therefrom not consider during a time period when the detector pixels 162 were not properly operating (e.g., detector pixels 162 that intermittently fail to operate properly), etc.

Figure 5:
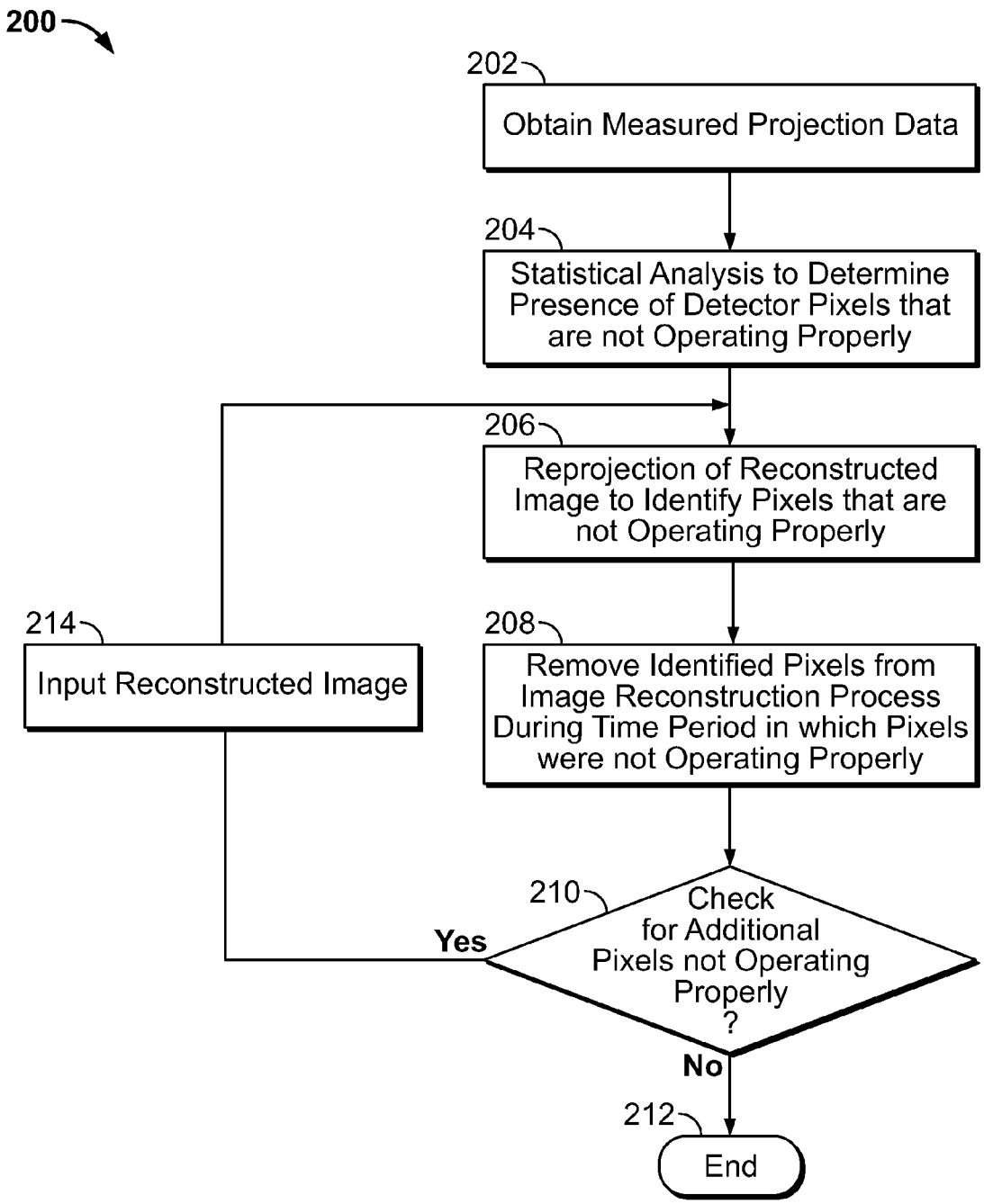
FIG. 5 is a flowchart of method in accordance with various embodiments of the invention for identifying pixels in a pixelated detector that are not operating properly.

A method 200 for identifying noisy pixels in a pixelated detector, for example, pixels 162 in the detector 150 that are not operating properly and that may, for example, introduce artifacts into a reconstructed image, is shown in FIG. 5. It should be noted that when reference is made herein to noisy pixels, this refers to any detector pixel that is flagged as not operating properly, for example, the data from that detector pixel is not providing useful or beneficial information to the image reconstruction process, such as, when the detector pixel is adding extra counts or missing counts. A detector pixel that is flagged, for example, as a noisy pixel may be a pixel that is failing to operate, operates only intermittently, operates erratically (even for a short period of time), etc. In general, a noisy pixel is one that provides an unreliable signal, even for a short or intermittent time period. Similarly a cluster of detector pixels may not operate properly (e.g., noisy pixels), in which case an acceptance criteria for the noisy pixels is determined based on the photons detected by the entire module or group of neighboring modules as described in more detail below.

The method 200 includes obtaining measured projection data at 202. This can include, for example, acquiring the projection data or accessing stored projection data. Thereafter, the method 200 includes performing a statistical analysis of the data detected by detector pixels at 202, for example, using a mean or standard deviation analysis of photon counts in adjacent or neighboring detector pixels, to determine the presence of pixels that are not operating properly (to thereby identify noisy pixels). For example, a determination may be made that the photon counts or a pixel data value recorded by one pixel is more than 2.0, 2.5, 2.9, 3.0, or some other statistical acceptance criterion factor different than one or more adjacent pixels. In one embodiment, for example, the photon count of one detector pixel is compared to the photon count of all adjacent or neighboring detector pixels to determine if a standard deviation threshold has been exceeded. It should be noted that the terms criterion and criteria are used interchangeably herein to refer to the singular and/or plural.

In various embodiments, a consistency metric is calculated for every detector pixel for use in identifying pixels that are not operating properly (e.g., noisy pixels) based on one or more acceptance criteria as described in more detail herein. The consistency metric can be calculated in different ways. For example, the consistency metric may be calculated by determining the correlation between each individual detector pixel and the pixels in that pixel's immediate neighborhood (e.g., adjacent pixels). In SPECT, for example, the collimator point spread function tends to impose certain smoothness on the image, namely that there is expected to be some correlation between adjacent detector pixels. The exact nature of that correlation depends on the point-spread function and the activity distribution, which can be calculated across the image. Thereafter, having determined the distribution of differences expected between a detector pixel and its immediate neighbors, detector pixels with an unusually large deviation within a local neighborhood can be identified. For example, if the value in the $i^{th}$ detector pixel is $x_i$, and the neighbors of the pixel are $x_{ij}$, with an average value $\hat{x}_{ij}$, then the following quantity can be calculated:

$$e_i = \frac{(x_i - \hat{x}_{ij})^2}{\hat{x}_{ij}} \qquad (1)$$

The calculated value is expected to follow approximately a chi-squared distribution ("approximately", because the underlying data representing the projection image tends to make larger variations a bit more likely than a chi squared distribution would predict). Evaluation of the distribution of $e_i$ then can be used to identify outliers, which can be marked as noisy pixels that need to be excluded from the image formation calculations.

For a uniform flood scan, the total counts measured on each pixel of the detector over a certain period of time can be added. Compensation of the detected counts for the geometric sensitivity arising from the relative location of the source and detector geometry is then provided. Thereafter, the statistical differences, for example, the mean and standard deviation of all the counts measured by the different detector pixels are determined. Any detector pixels whose value lies beyond a certain acceptance criterion, for example, three standard deviations are flagged, for example, identified or marked as possibly noisy. Further, based on the knowledge of the relative location of the flood source with respect to the detector, the expected counts (geometric sensitivity terms) versus the measured counts for the various pixels on the detector may be plotted as a 2D plot. The line at forty-five degrees, passing through the center, corresponds to a perfect alignment between expected and measured values. Detector pixel values that lie outside a certain predetermined acceptance interval can be marked as noisy pixels. The acceptance criteria in this case can be defined as a function of the expected counts. Accordingly, the effects of dead time, dark current, etc. can be taken into account and not just the global mean and standard deviation of the detected events.

Further, during data acquisition, the biodistribution of the activity is not known. In this case the 3D biodistribution can be reconstructed using the emission data. Using the biodistribution the current estimate of the projection data can be predicted. In particular, the difference between the value of the current estimate and the measured projection is determined. The difference is then divided by the corresponding current estimate to give the normalized difference. The consistency metric for every pixel on the detector then can be determined by calculating the statistical deviation of the values from its neighboring pixels. Based on an acceptance criteria (e.g., predetermined threshold value), the detector pixels that deviate beyond the accepted values are marked as noisy pixels. Further in an iterative reconstruction, only a certain subset of the data in the reconstruction may be used. For example, only a few of the measured projections in one iteration of the reconstruction may be used and the reconstructed image used to determine the noisy pixels in the rest of the measured projection data.

It should be noted that an individual pixel can turn noisy only for a certain period of the acquisition time. In this case, that pixel may be deactivated only for that particular time interval. This time interval when the pixel turns noisy can be determined either during the acquisition step or during reconstruction. At the acquisition step, the acquisition time may be divided into multiple time intervals. Thereafter, any particular time interval at which the detector pixel may have turned noisy is identified using an acceptance criteria and then disabled. Similarly during the reconstruction step the normalized error updates for a noisy detector pixel are higher compared to neighboring pixels. These detector pixels are identified and then disabled for the particular views or time intervals that the pixels were noisy, based on an acceptance criteria and to obtain artifact free (or artifact reduced) images.

If prior knowledge of the shape and distribution of the radiation in the source is known or based on the reconstructed image, it is possible to determine which pixels on the detector are exposed to the photons (e.g., emitted in SPECT or transmitted in CT). Based on this information, the detector pixels not exposed to radiation may or may not be used in the calculations for the detection of noisy pixels.

Thus, the pixels on the detector not exposed to any radiation are expected to have zero or very small counts. If these detector pixels exhibit very high counts then these pixels can be marked as probably noisy for later analysis. For example, let S denote the spatial domain of the image and T denote the time domain representation of the image. A spatial point in the 2D/3D reconstructed image space can be denoted as $x \in S$ while in the time domain a data point in the projection space can be represented as $p \in T$. While subdividing the data in the time domain, a subset $T_i$ can be selected such that $T = \cup_{i=1}^{N} T_i$ and analysis can be performed on that particular time domain. The time domain based subsets can be either independent of each other or can overlap while the N time bins need not be of the same duration. Similarly the measured data can further be divided into different subsets in the spatial domain as well as the temporal domain. For example, only some of the angles in the projection data can be used, and the reconstructed images from the different subsets used separately for the detection of the noisy pixels. Accordingly, let $x=(x, y, t)$ be a vector representing the 2D image in the spatial coordinated at time interval t (or $x=(x, y, z, t)$ for 3D). The measured projection in that time domain can be represented as $p_{i,t}$, while $h_i(x)$ represents the system matrix element that, in SPECT, represents the probability of the photons emitted in image voxel x contributing to the detector pixel element $p_i$. For example the physical effects such as object attenuation, scatter, radioisotope decay, point spread function, etc. may be modeled in the data detection process.

The voxels in the image space also can be arranged lexicographically as $f_j$, where $j=1 \ldots J$ stands for the different voxels in the image space x (with J as the maximum number of voxels). In this case, the projection of the current image estimate for the time domain is given by $\Sigma_{j=1}^{J} h_{ij} f_{jt}$ while the term representing the difference between the measured data and current estimate is given by $d_{it} = P_{it} - \Sigma_{j=1}^{J} h_{ij} f_{jt}$. It should be noted that using the difference is merely an example and other mathematical relationships such as a ratio (division), multiplication, etc. can be used for the detection of the noisy detector pixels.

It should be noted that the acceptance criteria used for the detection of the noisy detector pixels can be determined using different factors, for example, but not limited to a goodness of fit measures, such as by calculating the chi-square value, sum of squares of the residuals, standard deviation, or other statistical means.

It also should be noted that the determination of the presence of detector pixels that are not operating properly may be performed during pre-imaging or imaging. For example, the determination may be made based on known parameters for the imaging system, such as the geometry of the emission and detection process, and performed during a pre-imaging process. During imaging, the determination may be made without any active radiation source such that the detector pixels should have low counts.

Referring again to the method 200, it should be noted that prior to performing a statistical analysis at 202, initial procedures optionally may be performed to disable or turn off certain detector pixels. For example, a user may disable (e.g., selectively turn off) detector pixels known to have not previously performed properly based on prior information. This information may, for example, have been previously stored within the image scanner. A user also may disable any additional detector pixels that the user observes or observed to not operate properly, for example, based on inconsistent regions within an image.

Thereafter, at 206 a re-projection of the reconstructed image is performed to identify the one or more detector pixels that are not operating properly and the time period in which the one or more detector pixels were not operating properly (using acquired timing information from the imaging system). It should be noted that different detector pixels may not operate properly during different time periods as described herein. Once the detector pixels and time periods are identified (which in various embodiments also includes flagging the detector pixels), the identified pixels are accounted for in the image construction process. For example, at 208 image data for the identified detector pixel(s) may be removed from the image reconstruction process for that time period in which the detector pixel was not operating properly. For example, the locations in the image data corresponding to the identified detector pixels may be initialized such that the measured data from the identified detector pixel(s) are initialized (e.g., set) to zero. It should be noted that detector pixels having reprojected image values equaling zero may be removed from the process.

Thus, and for example, in the raw data, the value of noisy pixels may be adjusted to one of zero or an average of nearby values (that may be limited to the nearby detector pixels, or extended to other neighboring pixels in the projection/sinogram, if applicable) to form "first adjusted data." Then a "first estimation image" may be reconstructed from the "first adjusted data" or the reconstructed "first estimation image" may be re-projected. Alternatively, the value of noisy detector pixels may be replaced with the values of the corresponding pixels in the re-projected "first estimation image" to form "second adjusted data." Moreover, this process may be repeated N times to obtain the "$N^{th}$ estimated image" wherein N may be defined as follows:

1. A predefined value such as N=2, 3, . . . 20, for example, N is between 3 and 6.
2. Compare the "Nth estimation image" with the "(N−1)-th estimation image" and stop when the difference is smaller than a Predefined value, for example, less than 1% change in the value of any of the voxels.
3. Compare values of noisy detector pixels in the "$N^{th}$ adjusted data" with the "(N−1)-th adjusted data" and stop when the difference is smaller than a Predefined value, for example, less than 1% change in the value of any of the pixels.
4. Compare values of noisy detector pixels in the "$N^{th}$ adjusted data" with the "(N−1)$^{th}$ adjusted data" and stop when the residual differences are not significantly different from values expected from the stochastic nature of the underlying physics.

It should be noted that identified detector pixels may be accounted for in the image reconstruction process in different ways. For example, instead of removing the identified detector pixels from the image reconstruction process (e.g., setting the identified detector pixels to zero), values for the identified pixels may be estimated, for example, by extrapolation or interpolation as described in more detail herein. In other embodiments, and for example, the identified pixels may be corrected as also described in more detail herein. It could also be identified by reprojected values of the reconstructed image.

After the image data for the identified detector pixel(s) are removed from the image reconstruction process a determination may be made at 210 as to whether additional pixels are not operating properly. If the non-removed detector pixels are operating properly, then the method 200 ends at 212. Alternatively, the method 200 may be repeated at different time intervals, upon the determination of different events (e.g., start of a scan or storage of new measured projection data), etc. If the non-removed detector pixels are not operating properly, then the reconstructed image is input into the method 200 such that reprojection is performed at 206 and image data for identified additional pixels not operating properly are removed at 208 (or otherwise accounted for in the image reconstruction process).

Figure 6:
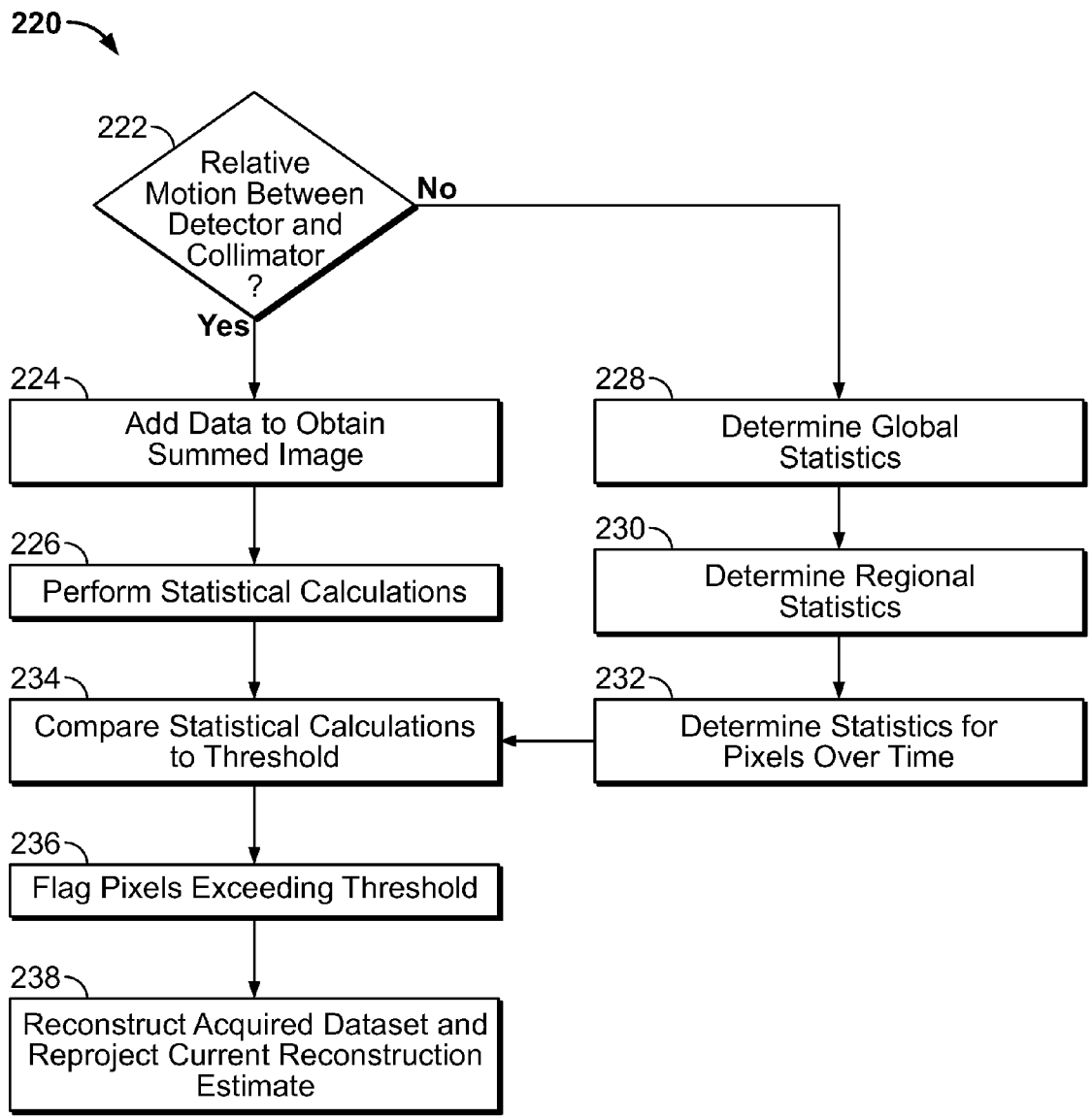
FIG. 6 is a flowchart of a detection method in accordance with various embodiments of the invention.

With respect to the statistical analysis at 204, a detection method 220 as shown in FIG. 6 may be performed. Specifically, at 222 a determination is made as to whether there is relative motion or movement between one or more detectors and collimator(s). If a determination is made that the imaging system has relative motion between the detector(s) and collimator(s), then at 224 data, for example, photon count data, is added together from some or all of the collimator positions relative to the detectors. For example, in a system that includes ten pixelated detectors each having 32×32 pixel arrays, the data from the entire scan is added to a 32×320 image. After the data is added together, a statistical calculation is performed at 226. For example, the mean or standard deviation of the data in the 32 rows of the image is determined, such as, along every septa for a slit-hole collimator imaging device. Essentially, the mean or standard deviation is calculated for every projection view.

Alternatively, at 224 data can be added to each of the 32×32 pixels or within a few pixels (e.g., adjacent or neighboring pixels) within each detector or to a set of detectors having data that is used to produce one side of the image. This alternative additive process is performed to reduce the effect of photon attenuation in the object, reduce the effect of the object not being aligned in the center of the examination axis, reduce the effect of non-uniform distribution of activity, etc. The mean or standard deviation is calculated for every projection view.

If at 222 a determination is made that there is no relative motion between the detector(s) and collimator(s), then at 228 the global mean and/or global standard deviation of all the detected counts (e.g., photon counts) is determined. It should be noted that extreme values may be removed and then a regional mean or regional standard deviation for one detector or a particular region of a detector determined at 230. Thereafter, at 232, the acquired data (e.g., photon counts) are divided into time bins based upon when the data was acquired. The standard deviation of each detector pixel for the various time bins is then determined. The time bins selected can be either distinct from each other or can be overlapping.

After the statistical calculations are performed at 226 or at 230 and 232, at 234 a determination is made as to whether the calculated statistical values exceed a predetermined threshold. For example, a determination may be made as to whether the detector pixel is dysfunctional or not operating properly by comparing the statistical values such as mean or standard deviation of the data in one pixel with the data in adjacent or neighboring pixels. The statistical values, such as the standard deviations differ by a predetermined threshold, for example, 2.0 or 3.0. In one embodiment, the threshold may be set to 2.9 standard deviations from the mean. It should be noted that the threshold determination is made after a predetermined number of iterations of an image reconstruction process as performed by an image reconstruction processor. For example, the determination of whether the standard deviation value for a detector pixel with respect to adjacent or neighboring pixels exceeds the threshold may be determined after the fourth image reconstruction iteration. However, the determination may be made after any number of iterations or may be made after multiple iterations. At 236, the detector pixels identified that exceed the threshold are flagged as pixels that potentially may not be operating properly.

Thereafter, at 238 the iterative reconstruction process continues with another reconstruction of the data set with the identified or flagged detector pixels corrected. It should be noted the data set is essentially re-projected in the iteration and this re-projection may be performed with or without smoothing.

Thus, various embodiments provide for the detection during image reconstruction of detector pixels that are not operating properly. The difference between the re-projection of the reconstructed image and the projection data (error term) is then used to identify detector pixels that are not operating properly. Once the current estimate is re-projected, the difference in the error term is determined. In one embodiment, the difference is the absolute value of the difference divided by the current value. However, any suitable method to quantify the difference between the projections of the current estimate and the measured projection (during the iterative reconstruction) may be used. As an example, if list mode data (e.g., photon counts in a list format) is present, then the data may be divided into different time bins and the difference of the error term determined for the time bins. For a current estimate, the reconstructed image from the entire acquisition time period may be used or a subset of the time period can be used. The mean and standard deviation of the error term then may be determined as described in more detail above and detector pixels having a standard deviation greater than a predetermined value (e.g., three) identified. The identified detector pixels are then flagged as not operating properly during at least a portion of the image acquisition. A determination may be made of whether the detector pixel is to be used during image reconstruction. For example, if the detector pixel only failed to properly operate in certain time bins, but operates properly in other time bins, then the detector pixel may be disabled or the data zeroed during the time periods defined by the bins (or only for particular views or projections) in which the detector pixel failed to operate properly.

It should be noted that other factors may be used to determine or confirm whether a particular detector pixel is not operating properly. For example, detector pixels having energy spectra not consistent with the measured gamma radiation may be confirmed as not operating properly.

It further should be noted that in some embodiments a maximum likelihood expectation maximization (MLEM) based reconstruction algorithm is used. However, the various embodiments may be implemented in connection with other reconstruction algorithms.

Figure 7:
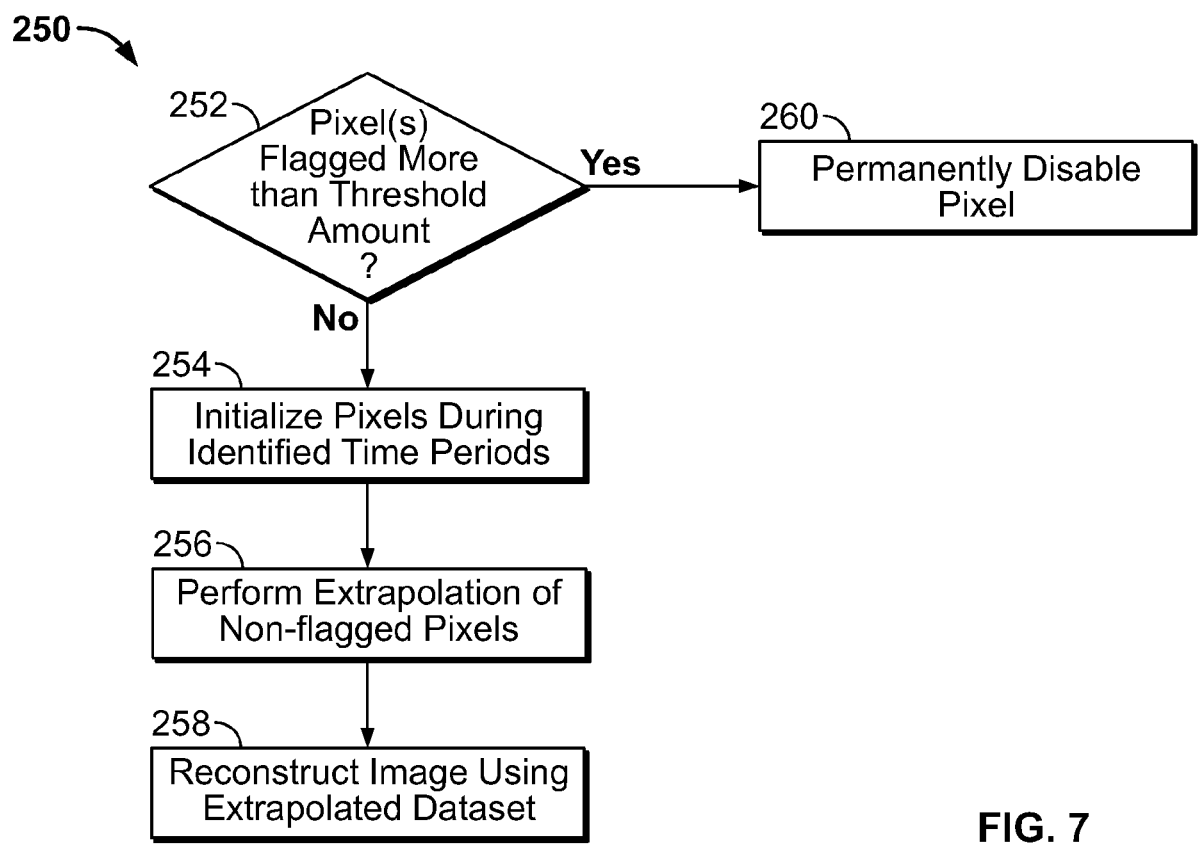
FIG. 7 is a flowchart of method in accordance with various embodiments of the invention for compensating for detector pixels identified as not operating properly.

Various embodiments also provide a method 250 as shown in FIG. 7 for compensating for detector pixels identified as not operating properly (as opposed to removing the pixels). Specifically, at 252 a determination is made as to whether a particular detector pixel has been flagged more than a threshold amount. For example, a determination is made as to whether a particular detector pixel has been flagged (as not operating properly) more than X times, for example, three times during one or more reconstructions based on one or more acquisitions. If the detector pixel has not been flagged more than the threshold amount, the flagged detector pixels are initialized at 254. Specifically, in one embodiment, the value of flagged detector pixels is set to zero for that period of time in which the detector pixel was flagged. For example, the time period may be defined by timing bins as described in more detail above. In one embodiment, in a normal matrix defining the image data as is known, the flagged detector pixel locations may be set to zero.

Thereafter at 256 extrapolation may be performed that reduces or eliminates high frequency artifacts at the edge of the non-flagged detector pixels and the flagged detector pixels. Essentially, data from properly operating or non-flagged detector pixels is extrapolated into the zeroed data for the flagged detector pixels, which then may be used as a base image. For example, a normal image (with the flagged pixel locations set to zero) may be convolved with a filter, such as a Gaussian filter, Bessel function, polynomial function, etc. Thereafter a reconstructed image is generated at 258 using the extrapolated dataset.

If a determination is made at 252 that one or more flagged detector pixel(s) exceed the threshold amount, then at 260 that pixel is permanently disabled. For example, the value of the detector pixel is permanently set to zero. For detector pixels that are turned off, the corresponding sensitivity matrix is also adjusted accordingly. For example in an MLEM based reconstruction during the backprojection of ones step, the values at the pixels corresponding to the noisy pixels are initialized to zero for a proper reconstruction. On the other hand, if the values from the neighboring detector pixels are extrapolated into the region corresponding to the noisy pixels, a similar operation is performed in the backprojection of ones step.

It should be noted that the various embodiments may be implemented on any type of imaging system. For example, the various embodiments may be implemented in a SPECT scanner that includes ten CZT detectors arranged in the form of a cylinder. The collimator used may be for example a pinhole, slit-hole, parallel, fan-beam, cone-beam, etc. Also, the various embodiments (e.g., noisy detector pixel detection and compensation methods) may be implemented in connection with a stationary detector and rotating collimator, either the detector or collimator is stationary with respect to the other or when the detector is rotation with respect to a stationary collimator.

At least one technical effect of the various embodiments of the invention is the dynamic detection during image reconstruction of pixels in a pixelated detector that are not operating properly. The dynamic detection may be performed during an iterative image reconstruction process. The detector pixels may be analyzed using statistical calculations. The various embodiments essentially analyze a detector pixel based on links through an image such that proper pixel operation is not only determined based on a comparison of adjacent or neighboring pixels, but also based on all of the pixels and all of the views that contributed to the final value of the detector pixel.

Some embodiments of the present invention provide a machine-readable medium or media having instructions recorded thereon for a processor or computer to operate an imaging apparatus to perform one or more embodiments of the methods described herein. The medium or media may be any type of CD-ROM, DVD, floppy disk, hard disk, optical disk, flash RAM drive, or other type of computer-readable medium or a combination thereof.

The various embodiments and/or components, for example, the processors, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, the ordering of steps recited in a method need not be performed in a particular order unless explicitly stated or implicitly required (e.g., one step requires the results or a product of a previous step to be available). While the dimensions and types of materials described herein are intended to define the parameters of the invention, they are by no means limiting and are exemplary embodiments. Many other embodiments will be apparent to those of skill in the art upon reviewing and understanding the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for identifying noisy pixels in a pixelated detector, the method comprising:
    obtaining data values for each of a plurality of pixels of a pixelated detector;
    determining a data consistency metric for each of the plurality of detector pixels;
    identifying, using the determined data consistency metric, any detector pixels that exceed an acceptance criterion as noisy pixels; and
    confirming an identified detector pixel when an energy spectrum for the identified pixel is not consistent with a measured gamma radiation, wherein the energy spectrum of each detector pixel is compared to that of adjacent good pixels or that of the entire detector.

2. A method in accordance with claim 1 wherein the acceptance criterion is based on a statistical deviation.

3. A method in accordance with claim 2 wherein the statistical deviation comprises at least one of a mean and a standard deviation.

4. A method in accordance with claim 1 further wherein the identifying is performed iteratively and further comprising performing a re-projection after each iteration of a reconstructed image and the reprojected data is used with or without smoothing.

5. A method in accordance with claim 1 further comprising determining a time at which any detector pixels exceed the acceptance criterion based on a plurality of timing bins in which the data values are sorted.

6. A method in accordance with claim 5 further comprising flagging the detector pixels exceeding the acceptance criterion.

7. A method in accordance with claim 6 further comprising initializing the identified detector pixels to zero at the time at which any pixel exceeds the acceptance criterion or exclude data from identified pixels from reconstruction.

8. A method in accordance with claim 6 further comprising correcting the identified detector pixels at the time at which any pixel exceeds the acceptance criterion by decreasing the bias voltage on that particular pixel.

9. A method in accordance with claim 6 further comprising estimating a value for the identified detector pixels at the time at which any pixel exceeds the acceptance criterion.

10. A method in accordance with claim 9 wherein the estimating comprises extrapolating values from detector pixels adjacent to the identified pixel.

11. A method in accordance with claim 9 wherein the estimating comprises interpolating values from detector pixels adjacent to the identified pixel.

12. A method in accordance with claim 1 further comprising excluding the data from the identified detector pixels during a subsequent iteration of an image reconstruction process.

13. A method in accordance with claim 12 further comprising re-projecting the reconstructed image with an initialized pixels.

14. A method in accordance with claim 12 further comprising assigning different values to the identified detector pixels after determining the values of the identified pixels after a plurality of iterations.

15. A method in accordance with claim 1 further comprising disabling detector pixels that exceed the acceptance criterion a predetermined number of times.

16. A method in accordance with claim 1 further comprising identifying the detector pixels after a number of image reconstruction processes.

17. A method in accordance with claim 1 wherein identifying the detector pixels comprises comparing one or more pixels of the plurality of pixels with one or more pixels in a vicinity thereof to determine a consistency metric value.

18. A method in accordance with claim 1 wherein the pixelated detector comprises a pixelated photon detector.

19. A method in accordance with claim 1 wherein the identifying is performed during a pre-imaging process and based on a geometry of an emission and detection process.

20. A method in accordance with claim 1 wherein the data values are obtained when no radiation source is operating.

21. A method in accordance with claim 1 further comprising using a radiation source and reconstructing an image to identify noisy detector pixels.

22. A method in accordance with claim 21 further comprising determining a difference in detector pixel counts for each of the plurality of pixels.

23. A method in accordance with claim 22 further comprising reconstructing an image and reprojecting the reconstructed image to determine a difference between the data values and the reprojected image.

24. A method in accordance with claim 23 further comprising determining whether the difference is within a predetermined threshold.

25. A method in accordance with claim 24 further comprising sub-dividing a measured projection based on one of time and spatial subsets to reconstruct an image.

26. A method in accordance with claim 25 further comprising identifying noisy detector pixels based on individual subsets or a combination of subsets.

27. A method for dynamically detecting and disabling noisy pixels in a pixelated detector, the method comprising:
using at least one statistical measure to identify a detector pixel that is not operating properly; and
correcting the identified detector pixel wherein the correcting comprises permanently disabling detector pixels that are identified more than a threshold amount of times as not operating properly.

28. A method in accordance with claim 27 wherein the correcting is performed only during a time period in which the detector pixel was not operating properly.

29. A method in accordance with claim 27 wherein the correcting comprises extrapolating non-identified detector pixels to identified pixels.

30. A method in accordance with claim 27 wherein the correcting comprises interpolating non-identified detector pixels to identified pixels.

31. A diagnostic imaging system comprising:
at least one pixelated detector including a plurality of pixels and configured to acquire photon data; and
a detector processor configured to identify any of the plurality of detector pixels for which the detected number of photons exceeds a statistical acceptance criterion as compared to other detector pixels of the plurality of pixels to determine noisy pixels, wherein an identified detector pixel is confirmed when an energy spectrum for the identified pixel is not consistent with a measured gamma radiation, and wherein the energy spectrum of each detector pixel is compared to that of adjacent good pixels or that of the entire detector.

32. A diagnostic imaging system in accordance with claim 31 wherein the processor is configured to determine noisy detector pixels one of prior to an image acquisition process, during an image acquisition process, during a pre-processing stage and during an image reconstruction process.

33. A diagnostic imaging system in accordance with claim 31 wherein the processor is configured to flag the identified detector pixels.

34. A diagnostic imaging system in accordance with claim 33 wherein the processor is configured to one of disable, remove or correct the flagged detector pixel.

* * * * *